No. 841,011. PATENTED JAN. 8, 1907.
T. F. HART.
METHOD OF DRAWING HOLLOW GLASS ARTICLES.
APPLICATION FILED FEB. 27, 1905.

2 SHEETS—SHEET 1.

WITNESSES
Warren W. Swartz
R A Baldwin

INVENTOR
Thomas F. Hart
by Bakewell & Byrnes
his atty's

No. 841,011. PATENTED JAN. 8, 1907.
T. F. HART.
METHOD OF DRAWING HOLLOW GLASS ARTICLES.
APPLICATION FILED FEB. 27, 1905.

2 SHEETS—SHEET 2.

WITNESSES

INVENTOR

UNITED STATES PATENT OFFICE.

THOMAS F. HART, OF MUNCIE, INDIANA, ASSIGNOR TO WINDOW GLASS MACHINE COMPANY, OF PITTSBURG, PENNSYLVANIA, A CORPORATION OF NEW JERSEY.

METHOD OF DRAWING HOLLOW GLASS ARTICLES.

No. 841,011.      Specification of Letters Patent.      Patented Jan. 8, 1907.

Application filed February 27, 1905. Serial No. 247,410.

*To all whom it may concern:*

Be it known that I, THOMAS F. HART, of Muncie, Delaware county, Indiana, have invented a new and useful Improvement in the Method of Drawing Hollow Glass Articles, of which the following is a full, clear, and exact description, reference being had to the accompanying drawings, forming part of this specification, in which—

Figure 1:
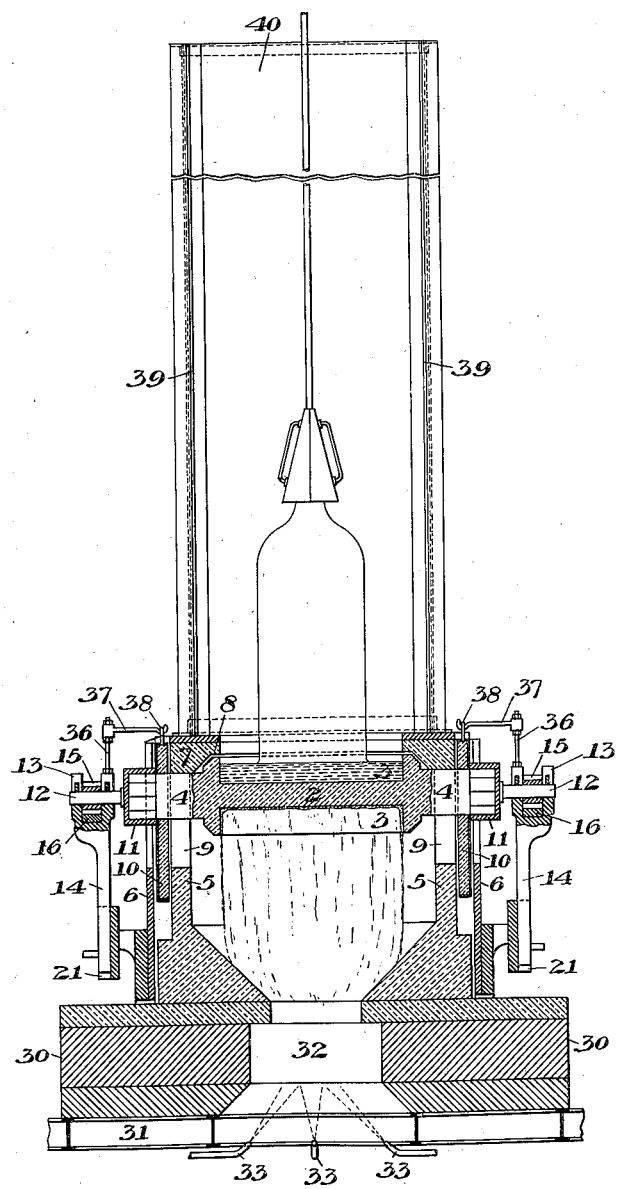
Figure 2:
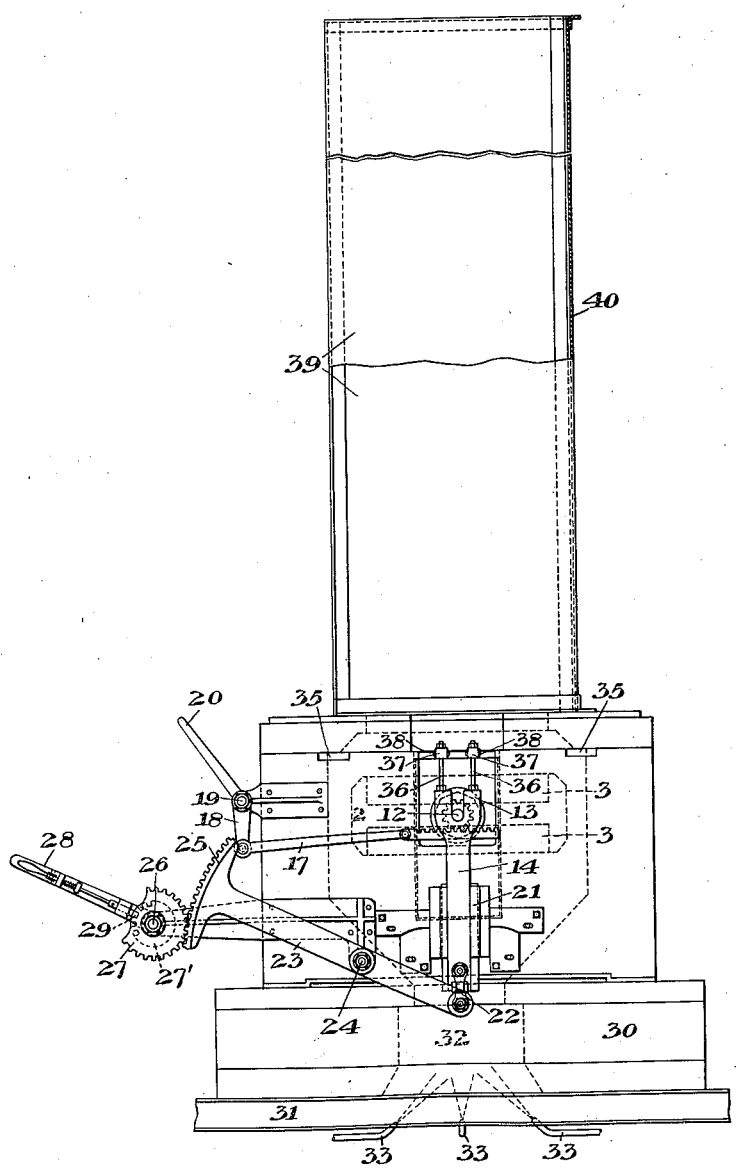

Figure 1 is a sectional front elevation showing apparatus for carrying out my invention; and Fig. 2 is a side elevation, partly broken away.

Heretofore in the drawing of hollow glass articles wherein the pot or receptacle was heated during the drawing operation it has been necessary to chill the glass at or near the drawing-point either by means of a cooling-ring, through which a fluid was fed, or by jets of air or by some other special chilling device. In the process heretofore used a hollow chilling-ring encircles the cylinder at or near the drawing-point, and the pot, which is heated from below, is provided with means for cutting off the heat from the drawing-point.

I have discovered that where hollow articles are drawn from a pot which is heated during drawing, such heat being kept away from the drawing-point, immediate results are obtained by drawing hollow glass cylinders or articles without any special chilling means applied at or near the drawing-point. For example, in drawing those cylinders for making window-glass which are known as "single thick" I have found that when the chilling device is done away with the glass will set and take its shape merely from the influence of the atmosphere. I have also found that where glass cylinders or hollow articles are drawn upwardly in the open air the air-currents in the building are liable to crack and injure the glass, especially where it is drawn in long lengths. I have overcome this difficulty by providing a shield or chamber which is arranged to at least partially inclose the cylinder during the drawing operation.

In the drawings, in which I show one form of apparatus for carrying out my invention, 2 represents the drawing-pot, which may be either a single pot or of the double reversible type set forth in the Thornburg Patent No. 759,329, dated May 10, 1904. I have shown the pot as of double form, having opposite cavities 3 3 for receiving the glass, so that one is upside down while the drawing operation is being carried out from the upper one. This pot is preferably formed in one integral piece of clay with projecting integral side trunnions 4 4, preferably polygonal in cross-section at their outer ends and cylindrical in cross-section where they extend through the slots or holes in the side walls 5 5 of the furnace-chamber. This furnace is shown as of square or rectangular form, with outer steel or iron plates 6 inclosing the brick or other refractory lining 5. The top stone 7 has a central hole of substantially the size of the pot-cavity and is beveled around the hole, as shown at 8, to make a neat fit with the correspondingly-beveled edge of the pot, thus making a joint which will substantially cut off the heated current from the glass at the drawing-point. The side walls are vertically slotted, as shown at 9, for a portion of their length, and between the slotted refractory lining and the slotted plates are placed shields 10, which have circular holes surrounding the cylindrical portions of the pot-trunnions extending through them. The octagonal or other angular-shaped end portions of the clay-trunnions fit within corresponding sockets 11, secured to metal trunnions 12, which rest within vertically-slotted bearings 13 of vertically-sliding supports or standards 14. The bearings 13 are forked, and between the forks pinions 15 are secured to the trunnions, these pinions engaging short racks 16, which slide within the bottom of the forked portion and are actuated by links 17, pivotally connected with levers 18, secured to a common shaft 19. The construction is the same as to the operating mechanism at each side, and a single hand-lever 20 is used to rock the shaft 19, and thus turn the pot on its trunnions.

The vertical standards 14 extend through dovetailed guideways 21 and at the lower end are connected by short links 22 with levers 23, pivoted to the sides of the furnace at 24. The links 22 are formed in two parts, with a turnbuckle connection between these parts having a right and left hand screw-thread, so that by turning the nut the link may be varied in length, thereby adjusting one side relatively to the other, so that the pot will be horizontal or will fit neatly against the sealing-joint with the top stone. The levers 23 are provided at their ends with segmental racks 25, engaging segmental pinions 27 on a common shaft 26, which is rocked by a suitable hand-lever 28. By rocking this lever the pot may be raised and lowered within the furnace-chamber. The handle 28 has a spring-pressed catch 29, which engages teeth on the fixed segment 27', so that the pot may be locked in any desired position.

The furnace-body rests upon a suitable refractory foundation 30, carried on I-beams 31, extending across a lower cave or tunnel under the furnace, the foundation having a a central eye 32 of cylindrical form, into which are directed a number of gas-jets 33. These gas-jets lead in from the sides and are thence bent upwardly, and the jet of gas and the flames suck the air upwardly into the eye, where it mixes and produces an intense combustion.

To cool the furnace-plate, I preferably provide an air-space between the outer plates and the brick lining, and to provide an outlet for the hot air and gases I provide slots 35 along the lower edges of the side plates.

In order to take the weights of the shields 10 off from the pot-trunnions, I preferably provide vertical supports 36 on the bearings 13, to which are adjustably secured hooked rods 37, engaging eyebolts 38, secured to the tops of the shields.

In order to inclose the glass cylinder during its drawing, I provide an inclosure which at least partially shields the cylinder from air-currents and exterior influences. In the form shown this consists of a casing having sides 39 and a back 40, the casing being in the form of a long vertical box open at the front. This casing preferably extends a sufficient distance to inclose the cylinder or article after the drawing operation is completed. It may be extended more or less fully around the article and serves to protect it during the time of drawing by providing around the same a substantially confined atmosphere.

In using the apparatus no chilling-ring and no other chilling device, such as an air-blast or other means, is employed for chilling the glass at or near the drawing-point. The bait is lowered into the glass in the usual manner, the cap is preferably formed as in the process heretofore employed, and the glass cylinder is then drawn upwardly, the setting or shaping at the drawing-point taking place merely under the cooling action of the atmosphere. The article is then removed laterally from the casing, and preferably lowered upon a support for cracking off preliminary to flattening.

The advantages of my invention result from doing away with the necessity for the chilling device and the immediate results obtained thereby. The apparatus is also made simpler and more easily operated. The shield or casing acts to assist in preventing cracking of the cylinder during drawing and cuts off currents of air.

The form of the casing or shield may be varied widely, and many variations may be made in the form and arrangement of the apparatus without departing from my invention, since I consider myself the first to draw a hollow glass article from a heated pot without the use of any chilling device.

I claim—

1. The method of drawing hollow glass articles, consisting in applying heat to a pot or receptacle containing molten glass, protecting the glass at the drawing-point from such applied heat, drawing a hollow glass article upwardly from the bath, and cooling the glass and causing it to set solely by the action of the atmosphere; substantially as described.

2. The method of drawing hollow glass articles, consisting in heating a pot or receptacle containing molten glass, cutting off such heat from the drawing-point, drawing a hollow cylinder upwardly from the receptacle, supplying air under pressure to the interior of the article, and cooling the glass and causing it to set at the drawing-point solely by atmospheric action; substantially as described.

3. The method of forming hollow glass articles, consisting in drawing the article upwardly within an inclosure arranged to surround the articles with a practically confined atmosphere throughout their length, and supplying air to the interior of the article during drawing; substantially as described.

4. The method of forming hollow articles, consisting in drawing them forwardly within an inclosed atmosphere extending substantially the full length of the articles, and thereby protecting them from external influences; substantially as described.

5. The method of forming hollow articles, consisting in drawing the article upwardly within a partial inclosure extending substantially the full length of the articles, and arranged to surround the same by a quiescent atmosphere, allowing access to the drawing during drawing, and then removing the article laterally from the inclosure; substantially as described.

6. The method of forming hollow glass articles, consisting in drawing the hollow inclosed glass article upwardly from a bath of molten glass, applying heat to the pot or receptacle containing the glass from which the article is drawn, protecting the glass at the drawing-point from the applied heat, and cooling the glass being drawn and causing it to set by the action of the atmosphere; substantially as described.

In testimony whereof I have hereunto set my hand.

THOMAS F. HART.

Witnesses:
 H. T. HUIMA,
 JOHN MILLER.